US012664891B2

(12) United States Patent
Heyl

(10) Patent No.: US 12,664,891 B2
(45) Date of Patent: Jun. 23, 2026

(54) FULFILLMENT OF A SAFETY REQUIREMENT OF AT LEAST ONE VEHICLE

(71) Applicant: Robert Bosch GmbH, Stuttgart (DE)

(72) Inventor: Andreas Heyl, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 266 days.

(21) Appl. No.: 18/487,790

(22) Filed: Oct. 16, 2023

(65) Prior Publication Data

US 2024/0161616 A1　May 16, 2024

(30) Foreign Application Priority Data

Nov. 15, 2022　(DE) ..................... 10 2022 212 110.4

(51) Int. Cl.
*G08G 1/0968* (2006.01)
*B60W 60/00* (2020.01)
*G08G 1/00* (2006.01)

(52) U.S. Cl.
CPC ... *G08G 1/096833* (2013.01); *B60W 60/0015* (2020.02); *G08G 1/22* (2013.01); *B60W 2556/45* (2020.02); *B60W 2756/10* (2020.02)

(58) Field of Classification Search
CPC .............. G08G 1/096833; G08G 1/22; B60W 60/0015; B60W 2756/10; B60W 2556/45
See application file for complete search history.

(56) References Cited

U.S. PATENT DOCUMENTS

2023/0199448 A1 *　6/2023　Cho .......................... G08G 1/22

FOREIGN PATENT DOCUMENTS

| | | |
|---|---|---|
| DE | 102017210081 A1 | 12/2018 |
| DE | 102019110623 A1 | 10/2020 |
| DE | 102019134683 A1 | 6/2021 |
| DE | 102021206909 A1 | 1/2022 |

OTHER PUBLICATIONS

ISO/PAS 21448 Road Vehicles—Safety of the Intended Functionality, 2019, pp. 1-64.

* cited by examiner

*Primary Examiner* — Jay Khandpur
(74) *Attorney, Agent, or Firm* — NORTON ROSE FULBRIGHT US LLP

(57) ABSTRACT

A method for fulfilling a safety requirement of at least one vehicle in a driving situation at a point in time t. The method includes: determining a first safeguarded and position-dependent environment region of the vehicle; determining a second safety-relevant and position-dependent environment region of the vehicle; checking whether the second environment region is covered by the first environment region in the driving situation of the vehicle, and, if not, generating an item of environment region information of the vehicle based on the detected first and second environment regions and a perception function corresponding to the generation of each of the environment regions; transmitting the environment region information to an application; evaluating the environment region information by the application; and generating at least one item of suggestion information so that the safety requirement for the driving situation at the point in time t of the vehicle is fulfilled.

17 Claims, 3 Drawing Sheets

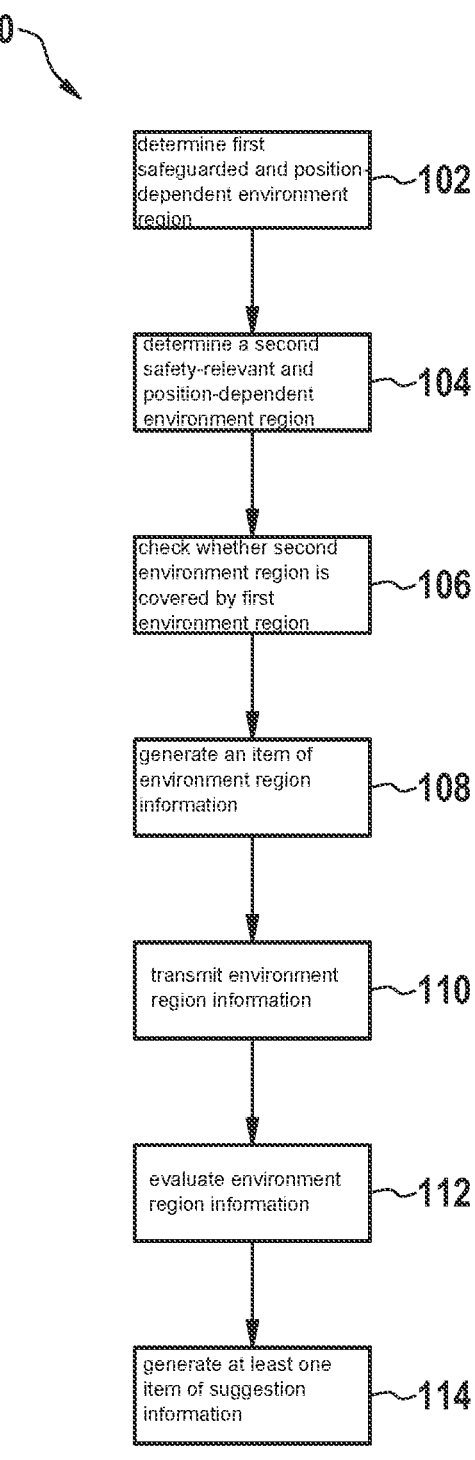

100 determine first safeguarded and position-dependent environment region ~102 determine a second safety-relevant and position-dependent environment region ~104 check whether second environment region is covered by first environment region ~106 generate an item of environment region information ~108 transmit environment region information ~110 evaluate environment region information ~112 generate at least one item of suggestion information ~114

FIG. 1

FULFILLMENT OF A SAFETY REQUIREMENT OF AT LEAST ONE VEHICLE

CROSS REFERENCE

The present application claims the benefit under 35 U.S.C. § 119 of German Patent Application No. DE 10 2022 212 110.4 filed on Nov. 15, 2022, which is expressly incorporated herein by reference in its entirety.

FIELD

The present invention relates to a method for fulfilling a safety requirement of at least one vehicle.

BACKGROUND INFORMATION

One of the greatest challenges of automated driving (AD) is the control of the unavoidable functional deficiencies of the individual components of the overall AD system of the vehicle. Such deficiencies include, on the one hand, the inability of the function to correctly detect and safely operate a driving situation. In particular, this also comprises functions that use machine learning algorithms. On the other hand, this also relates to insufficient robustness of the function with respect to sensor input fluctuations or different environmental conditions.

Conventional safety concepts for perception or for the generation of an environment model for autonomous driving, so-called ADSs (=automated driving systems), are mostly based on the specifications of ISO/PAS 21448 (SO-TIF) and aim to identify all functional deficiencies as early as possible in the design phase and to design the perception system (sensors, algorithms, etc.) in such a way that it is as robust as possible against all possible conditions or scenarios or critical environmental situations, the so-called "triggering conditions" (=TCs), in all possible scenarios, for example through multi-modal redundancy of the sensor system (for example, use of radar instead of video in fog).

In addition, there are more advanced approaches to determine the current basic visibility ("field of view") of the individual sensors during operation as well, and to limit the performance of the AD system, for example in the systems of behavior and trajectory planning, in case of restrictions of the perception, for example due to environmental influences such as light conditions or rain/snow, or also by specifying a maximum vehicle speed).

However, such approaches described above have the following shortcomings.

For more complex ODDs (=operational design domains), it is impossible to, in advance, determine and analyze all possible critical environmental situations analytically and by simulation.

Technical and cost restrictions also set a limit to the achievable robustness of the perception system. During operation, situations ("surprises") will occur again and again, in which the performance of the perception systems is recognized as limited (for example, due to low confidence of the measurements) and as a consequence, the performance of the overall system must also be limited. Furthermore, restrictions of the performance of the overall system can have an impact on the comfort of the user (for example, extension of the driving time) and on the safety of the system, for example if spontaneous "surprises" require a rapid reaction, for example the transition to the safe state of "vehicle stop in lane."

However, in a defined operating region of a vehicle fleet, some TCs or critical environmental situations can occur systematically, for example due to local conditions such as concealments by trees or parked vehicles, reflective surfaces on the ground or buildings, typical traffic situations, etc., possibly also in conjunction with environmental conditions such as weather and time of day and the associated light conditions.

If one could identify such local, systematically occurring TCs, one (for example, a mobility service provider) might also be able to take measures to prevent them or reduce their occurrence, including through constructive interventions in the hard or digital infrastructure (for example, in collaboration with a road operator or a municipality). However, even if these TCs were not completely avoidable, information about the likelihood that such TCs can be present at certain positions could be provided to a vehicle/fleet, for example via map data, such that a critical system response could be prevented by the ADS via anticipatory driving.

It is an object of the present invention to provide a solution by means of which environmental situations that occur systematically and are critical for a vehicle can be reliably identified in an efficient and reliable manner, in order to derive suitable measures or instructions for action for a safety requirement of the vehicle.

SUMMARY

The object may be achieved by a method for fulfilling a safety requirement of at least one vehicle in a driving situation at a point in time t, having features of the present invention.

According to a first aspect, the present invention relates to a method for fulfilling a safety requirement of at least one vehicle in a driving situation at a point in time t. According to an example embodiment of the present invention, the method includes the following steps.

In a first step, a determining a first safeguarded and position-dependent environment region of the vehicle is performed, which covers the region around the at least one vehicle for which a specific and safety-related perception function is provided with a minimum degree of reliability, in order to fulfill a situation-specific and/or behavior-specific safety requirement for the driving situation of the vehicle.

In a second step, determining a second safety-relevant and position-dependent environment region of the at least one vehicle is performed, which covers the region around the at least one vehicle for which a specific and safety-related perception function has to be provided with an increased possible degree of reliability, in order to guarantee a situation-specific and/or behavior-specific safety requirement for the driving situation of the vehicle and to guarantee the safe driving operation of the vehicle without vehicle performance restrictions.

In a third step, check whether the second environment region is covered by the first environment region in the driving situation of the at least one vehicle is performed, and, if this is not the case, in a fourth step, generating an item of the environment region information of the at least one vehicle is performed on the basis of the detected first and second environment regions and the perception function corresponding to the generation of each of the environment regions.

In a fifth step, transmitting the environment region information to an application is performed.

In a sixth step, evaluating the environment region information by the application is performed.

In a seventh step, generating at least one item of suggestion information is performed so that the safety requirement for the driving situation at the point in time t of the at least one vehicle is fulfilled.

Within the meaning of the present invention, a perception function can, by definition, include information about the environment that can come from various sensor sources, or more generally, information sources—sensor data, sensory data, environment models, external information. The perception function also differs from a sensor function in that a sensor with the same data can contribute to different perception functions, such as recognizing object contours, recognizing colors, traffic lights, etc. Furthermore, a safety-related perception function within the meaning of the present invention can also mean, for example: timely recognition of static or dynamic objects to avoid a collision, timely recognition of traffic infrastructure such as traffic lights and their states, timely recognition of lines or boundaries not to be crossed to avoid various types of accidents.

Further, to be sure, the present invention primarily relates to a vehicle. However, the present invention is not limited to this and could therefore be transferred to vehicles of all types, in particular to vehicles with an automation function, i.e., vehicles that can drive at least partially autonomously.

A fundamental idea of the present invention is to fulfill a safety requirement of a vehicle for a future driving situation at a point in time. In principle, according to an example embodiment of the present invention, this requires the following actions. Initially, a (continuous) determination of the current moment's safeguarded perception region for specific perception functions is performed by each vehicle or the ADS during operation. Second, a (continuous) determination (inside or outside the vehicle) of the perception region relevant for the safety of the vehicle or ADS in the current situation is performed (also in a manner specific to perception function). Thirdly, it is checked whether this region is covered by the safeguarded region and fourthly, such data and the comparison result are then transferred to a backend, in the form of a data processing system to an application for evaluation. In this case, the data can preferably be supplied or generated by a plurality of vehicles from a vehicle fleet.

With the results of the evaluation over a state of the entire vehicle fleet, it can be advantageously determined by data analysis where (regionally) the safeguarded perception regions are (more often) restricted. In addition, it is advantageous to determine whether such restrictions were safety-critical or led to a reduction in performance.

This information can then be used to derive suitable improvement or mitigation measures for a vehicle or a plurality of vehicles in a fleet in order to increase or optimize the safety of the overall system in an automated manner.

In this case, the following advantages relevant for a vehicle or the vehicle fleet can be achieved by the method according to the present invention:

improvement of the design of the vehicle/fleet ADS perception system, in order to compensate for TCs or reduce perception restrictions, provision of regions of high probability of TC5 or restrictions to the ADS via map data for the vehicle/fleet, targeted local adjustments in transportation infrastructure, in order to avoid such detected restrictions in the future, such as removal of cover such as vegetation, adjustments to roadway layout, improvement of markings, etc., targeted enhancement of the local digital infrastructure, in order to support the ADS perception system or compensate for its weaknesses, for example, additional provided information about regions not visible by the ADS by placing video cameras in a detected critical environment region of the vehicle or vehicle fleet.

Within the meaning of the present invention, the safeguarded and position-dependent environment region or perception region of a vehicle is also defined as the region around the vehicle, described for example as a polygonal course, in which a higher degree or minimum degree of vehicle performance with respect to reliability or safety of the perception function is achieved in the current state.

In this case, the safety or a safety requirement to be fulfilled for the vehicle in a driving situation at a point in time t also refers to the following properties to be advantageously achieved for a vehicle or a vehicle fleet:

redundancy of perception, for example at least two sensors cover this region and contribute to the perception function, integrity of perception, for example the combined ASIL of all sensors covering the region and contributing to the perception function is ASIL D, qualitative classification (so-called SOTIF capability class) of perception: for example, given environmental conditions, the ability of sensors to contribute to the perception function is sufficiently good, good or poor. For example, a lidar is not able to recognize color in principle, a radar could be currently limited by reflections in the tunnel and a video camera could be blinded by the sun, current confidence of the measurements, which should be sufficiently high or above a given limit value (or the "uncertainty" should be sufficiently low), determined, for example, by metrics such as covariance via Bayes filter, confidence class (DNN), uncertainty metric (DNN), etc., equally important is the distinction between individual perception functions (with respect to the relevant characteristics of the environment), for example recognition of the existence of objects, determination of the dynamic state of objects, recognition of color (for example, traffic lights), recognition and interpretation of gestures, recognition of sounds, etc.

The safety-relevant and position-dependent environment region or perception region of a vehicle, which can also be detected dynamically, i.e. during operation of the vehicle, is defined within the meaning of the present invention as the region around the vehicle which guarantees safe driving operation without vehicle performance restrictions along with the fulfillment of the situation-specific safety requirement for the driving situation of the vehicle. In such safety-relevant environment, a higher degree of reliability or safety of the perception function must therefore be achieved in order to ensure safe operation—without performance restrictions of the vehicle. In this case, safety refers to the same properties as listed above, but now existing as requirements.

The present invention also makes it possible to advantageously avoid critical operating situations with a high risk for the automated vehicle in a driving situation at a point in time t, for example with respect to a possible accident while at the same time having limited mitigation options, in advance by deriving and implementing vehicle-specific and/or infrastructure-specific measures in good time on the basis of the collected data of the vehicle or the vehicles of a fleet.

One example embodiment of the method of the present invention provides that the at least one vehicle is connected to the application via a communication interface for bidirectional data exchange. This ensures the advantage of efficient data exchange between the vehicle and the application.

An example embodiment of the method of the present invention provides that, with the step of generating, transmitting the generated and at least one item of suggestion information from the application to the at least one vehicle is provided. This has the advantage that the vehicle behavior can be adjusted efficiently and in good time to the driving situation at a point in time t.

One possible example embodiment of the method of the present invention provides that the application is at least partially designed as an off-vehicle and cloud-based data processing unit. This has the advantage that an efficient sharing in-vehicle and off-vehicle computing resources is performed.

A possible example embodiment of the method of the present invention provides that the environment region information further includes at least data about the state of the at least one vehicle and/or environment data of the at least one vehicle. This has the advantage that detailed and higher-quality environment information can be made available for evaluation in order to generate and optimize improved measures tailored to a specific driving situation of the at least one vehicle.

One possible example embodiment of the method present invention provides that the application is designed to qualitatively assess, on the basis of the received environment region information of the at least one vehicle, whether the second environment region is sufficiently covered by the first environment region in the driving situation of the at least one vehicle, taking into account the at least one safety requirement. This has the advantage of conserving in-vehicle resources of the at least one vehicle for performing the evaluation.

One possible example embodiment of the method of the present invention provides that the step of evaluating provides for assessing position-dependent safety requirements for at least one environment region of the at least one vehicle. This has the advantage of efficiently adjusting the vehicle behavior accordingly by performing an environment-specific configuration from a perception function in the form of sensor functions configured according to the situation.

A possible example embodiment of the method of the present invention provides that the step of evaluating further provides for assigning a requirement level to the at least one environment region of the at least one vehicle. This has the advantage that a corresponding perception function in the form of sensor functions configured according to the situation is provided within the vehicle on the basis of the defined requirement level in order to adequately implement a corresponding safety function or safety requirement for the at least one vehicle.

A possible example embodiment of the method of the present invention provides that the step of evaluating provides for assessing the relevance and/or frequency of locally occurring events in the at least one environment region of the at least one vehicle in order to detect a change in the at least one environment region of the at least one vehicle. This has the advantage that it is possible to react efficiently and quickly to changes in the environment in order to adequately implement a corresponding safety function or safety requirement for the at least one vehicle.

A possible example embodiment of the method of the present invention provides that the evaluation is performed by a graphical representation in the form of a 3D grid model or polygon course model, which further reflects a gradual gradation of the safety region in the at least one environment region of the at least one vehicle. This has the advantage that a quick and efficient overview of relevant and less relevant environment regions with respect to safety requirements can be created or displayed, which can speed up the evaluation of the data.

A possible example embodiment of the method of the present invention provides that generating the at least one item of suggestion information provides for suggesting at least one in-vehicle measure for the at least one vehicle, which, on the basis of the predetermined safety requirement, provides for at least one environment-dependent and/or situation-dependent adjustment of the configuration of the sensors available in the at least one vehicle, an adjustment of the driving strategy of the at least one vehicle and/or a provision of information about a change of infrastructure in the at least one environment region of the at least one vehicle via a digital map in order to enable anticipatory driving of the at least one vehicle. This has the advantage that the vehicle behavior can be flexibly adjusted efficiently as a function of each driving situation at the point in time t in order to always fulfill the corresponding safety requirement for each driving situation. Such in-vehicle measures implicitly include an adjustment of algorithms of a perception system (=sensor system in the vehicle) and thus also of the possible perception region of the at least one vehicle. This makes it possible in an advantageous way to provide a different or adjusted sensor configuration or sensor requirements for specific or detected environment regions of the vehicle that are more relevant to safety. For example, if a vehicle is traveling through a tunnel with reduced light, then detection of corresponding environment regions with cameras alone would be of little help.

A possible example embodiment of the method of the present invention provides that generating the at least one item of suggestion information provides for weighting or prioritizing the at least one item of suggestion information from a plurality of possible items of suggestion information as a function of vehicle-specific, situation-specific and/or environment-specific parameters. This has the advantage that the optimum measure for the vehicle is always suggested in the respective driving situation.

A possible example embodiment of the method of the present invention provides that generating the at least one item of suggestion information provides for making a suggestion for improving local environmental conditions that improve a physical and/or digital traffic infrastructure in the at least one environment region of the at least one vehicle. This has the advantage that a critical driving situation for the vehicle can be permanently avoided, and in this way accidents can be prevented.

One possible example embodiment of the method of the present invention provides for transmitting the generated and at least one item of suggestion information to a fleet of vehicles. This has the advantage that the driving behavior of a plurality of vehicles can be optimized automatically, without the vehicles themselves having to provide the corresponding resources to generate this suggestion information.

One possible example embodiment of the method of the present invention provides that the application is designed to assess various types of environment information transmitted to the application by a number of vehicles in a fleet and to generate optimized and vehicle-specific suggestion information using a machine learning model for the number of fleet vehicles. This has the advantage that a plurality of vehicles can have their driving behavior optimized in an automated way, and the driving behavior of vehicles in the past leads to improved suggestion information for vehicles in the future driving range.

According to a second aspect, the present invention relates to a computer program containing machine-readable instructions that, when executed on one or more computers and/or computer instances, cause the one or more computers and/or computer instances to execute the method according to the present invention.

According to a third aspect, the present invention relates to a machine-readable data carrier and/or download product having the computer program.

According to a fourth aspect, the present invention relates to one or more computer instances having the computer program, and/or having the machine-readable data carrier and/or download product.

Further measures improving the present invention are explained in more detail below, together with the description of the preferred embodiments of the present invention, with reference to figures.

BRIEF DESCRIPTION OF THE DRAWINGS

FIG. 1 shows a schematic flow diagram of method 100 for fulfilling a safety requirement of at least one vehicle in a driving situation at a point in time t, according to an example embodiment of the present invention.

DETAILED DESCRIPTION OF EXAMPLE EMBODIMENTS

Figure 2:
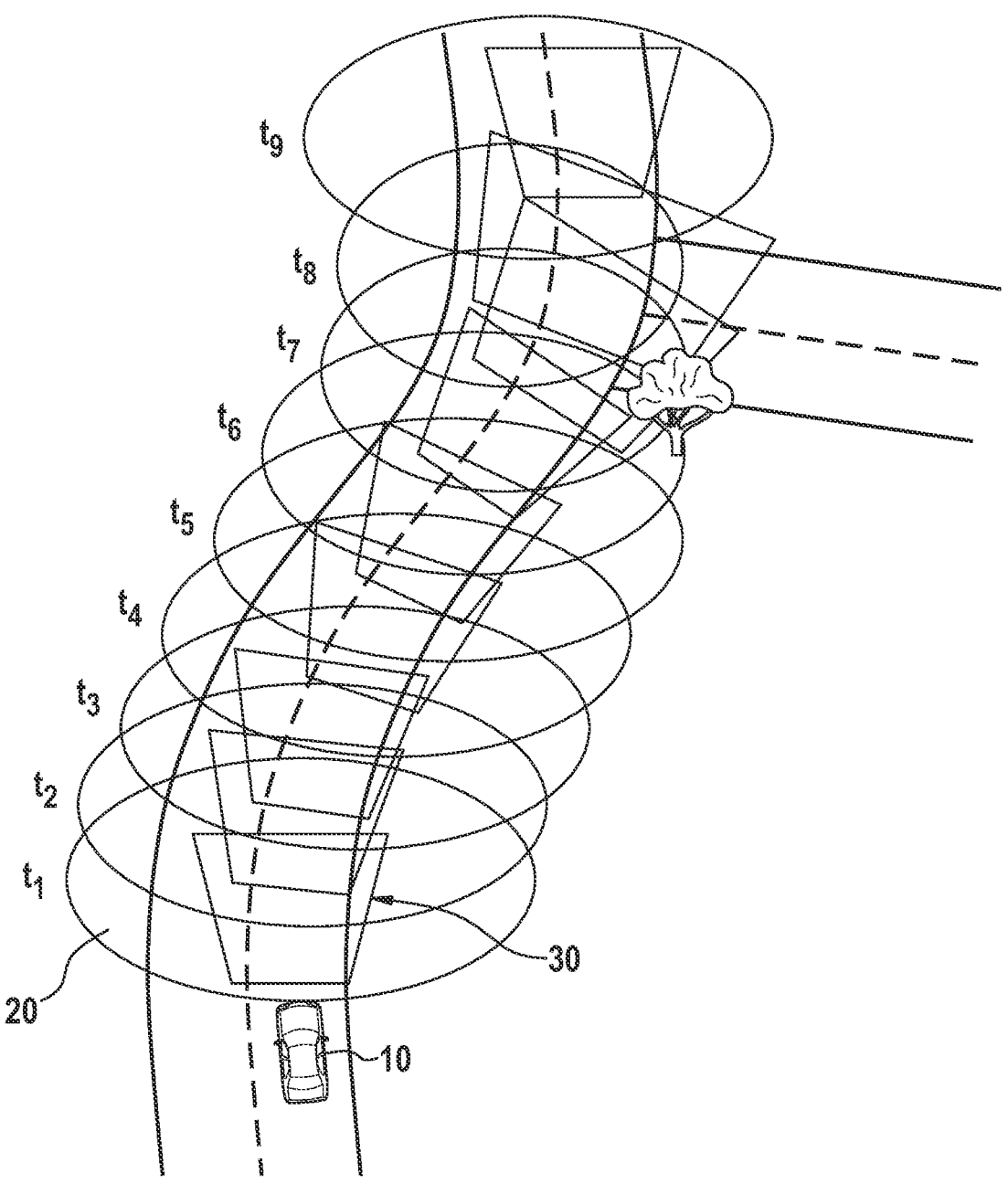
FIG. 2 shows an exemplary representation of a scenario for determining environment regions for a vehicle at various points in time t1 to t9 according to an example embodiment of the present invention.

FIG. 1 is a schematic flow diagram of the method 100 for fulfilling a safety requirement of at least one vehicle 10 in a driving situation at a point in time t.

In step 102, determining 102 a first safeguarded and position-dependent environment region 20 of the vehicle 10 is performed, which covers the region around the at least one vehicle 10 for which a specific and safety-related perception function is provided with a minimum degree of reliability, in order to fulfill a situation-specific and/or behavior-specific safety requirement for the driving situation of the vehicle 10.

In step 104, determining 104 a second safety-relevant and position-dependent environment region 30 of the at least one vehicle 10 is performed, which covers the region around the at least one vehicle 10 for which a specific and safety-related perception function must be provided with an increased or maximum possible degree of reliability, in order to guarantee fulfillment of a situation-specific and/or behavior-specific safety requirement for the driving situation of the vehicle 10 and to guarantee safe driving operation of the vehicle 10 without vehicle performance restrictions.

Alternatively, the step 104 can provide that, with an increased or maximum possible degree of reliability, a specific and safety-related perception function must be provided in order to guarantee that a situation-specific and/or behavior-specific safety requirement for the driving situation of the vehicle 10 is fulfilled at a given required performance.

In step 106, a check is performed as to whether the second environment region 30 is covered by the first environment region 20 in the driving situation of the at least one vehicle 10, and if this is not the case, in step 108, generating an item of environment region information of the at least one vehicle 10 is performed on the basis of the detected first and second environment regions 20, 30 and the perception function corresponding to the generation of the respective environment regions 20, 30. In this case, the step of checking can be performed externally (in the application 60) and/or in the vehicle 10 itself—provided that in-vehicle resources are available.

In step 110, transmitting the environment region information to an application 60 is performed for evaluation of such data.

The environment region information can further optionally include the following other data:

safeguarded perception regions/environment regions per position (absolute coordinates) and perception function safety-critical perception regions/environment regions per position and perception function vehicle state in dynamic state, exact position of the vehicle metadata about the environment, for example ODD information such as time of day, weather conditions, traffic density, etc., to take into account (or determine) TCs or critical environment situations current fault memory of the vehicle In step 112, evaluating the environment region information by the application 60 is performed.

In this case, the step 112 of evaluating can provide for an assessment of position-dependent safety requirements for at least one environment region 20, 30 of the at least one vehicle 10.

Further, optionally, the step 112 of evaluating can provide for assigning a requirement level to the at least one environment region 20, 30 of the at least one vehicle 10. This requirement level can refer to the required perception function in the vehicle 10, i.e., which sensors or sensor functions must be provided or interconnected by the vehicle or configured in which way in order to optimally cover the relevant and situation-dependent environment regions 20, 30 for the vehicle 10 while complying with a safety requirement.

Optionally, the step 112 of evaluating can further provide for an assessment of the relevance and/or frequency of locally occurring events in the at least one environment region 20, 30 of the at least one vehicle 10, in order to detect a change in the at least one environment region 20, 30 of the at least one vehicle 10.

In this context, the information could further be relayed from the vehicle 10 that the vehicle 10 is safeguarding far more than is relevant to safety. If this occurs more frequently, an item of suggestion information could lead to a design change and/or cost-saving reduction of the sensor system in the vehicle 10.

The evaluation can be performed, for example, by a graphical representation in the form of a 3D grid model or polygon course model, which further reflects a gradual gradation of the safety region in the at least one environment region 20, 30 of the at least one vehicle 10.

For example, it can be provided, in the form of a simulated visual and/or tactile color field around the vehicle, to indicate which environment regions around the vehicle are or will be green (=high safety) and red (=low safety) in the respective driving situation or which regions of the environment are actually relevant to safety in order to then set the focus of the available sensors or perception functions in the respective vehicle accordingly. This can change dynamically with the driving situation in each case.

Furthermore, in step 112 of the evaluation, an assessment of route sections can be performed with respect to statistics regarding the non-coverage of the safety-critical perception regions/environment regions by the safeguarded perception regions/environment regions (both in a manner specific to perception function)

statistics regarding coverage, with assessment of quality, for example, sufficient coverage and high safety margins (for example, 20 m required, but even 30 m guaranteed, or confidence of 95% required, but even confidence of 99% achieved).

sufficient coverage, but only small safety margins, i.e. lower robustness against negative influences In step 114, a generation 114 of at least one item of suggestion information is performed so that the safety requirement for the driving situation at point in time t of the at least one vehicle 10 is fulfilled.

The suggestion information generated in this way will be explained in more detail below:

The generated suggestion information can be designed to suggest at least one in-vehicle measure for the at least one vehicle 10 that provides the following on the basis of the predetermined safety requirement:

environment-dependent and/or situation-dependent adjustment of the configuration of the sensors available in the at least one vehicle 10, adjustment of the driving strategy of the at least one vehicle 10 and/or provision of information about a change of infrastructure in the at least one environment region 20, 30 of the at least one vehicle 10 via a digital map. In this way, an improved and anticipatory driving of the vehicle 10 can be enabled.

Furthermore, the generating of the at least one item of suggestion information can provide for weighting or prioritizing the at least one item of suggestion information from a plurality of possible items of suggestion information as a function of vehicle-specific, situation-specific and/or environment-specific parameters.

Optionally, generating the at least one item of suggestion information can also provide for making a suggestion for improving local environmental conditions, which can improve a physical and/or digital traffic infrastructure in the at least one environment region 20, 30 of the at least one vehicle 10.

FIG. 2 shows an exemplary representation of a scenario for determining environment regions 20, 30 for a vehicle 10 at various points in time t1 to t9 according to one embodiment of the present invention.

FIG. 2 shows scenarios for a detected first environment region 20 and second environment region 30 at various points in time t1 to t9, which the vehicle 10 covers on its route. In this case, at each point in time t, it is checked whether the second and safety-relevant environment region 30 is covered in real time by a safeguarded first environment region 20. This is performed with the method according to the present invention, as detailed above.

Figure 3:
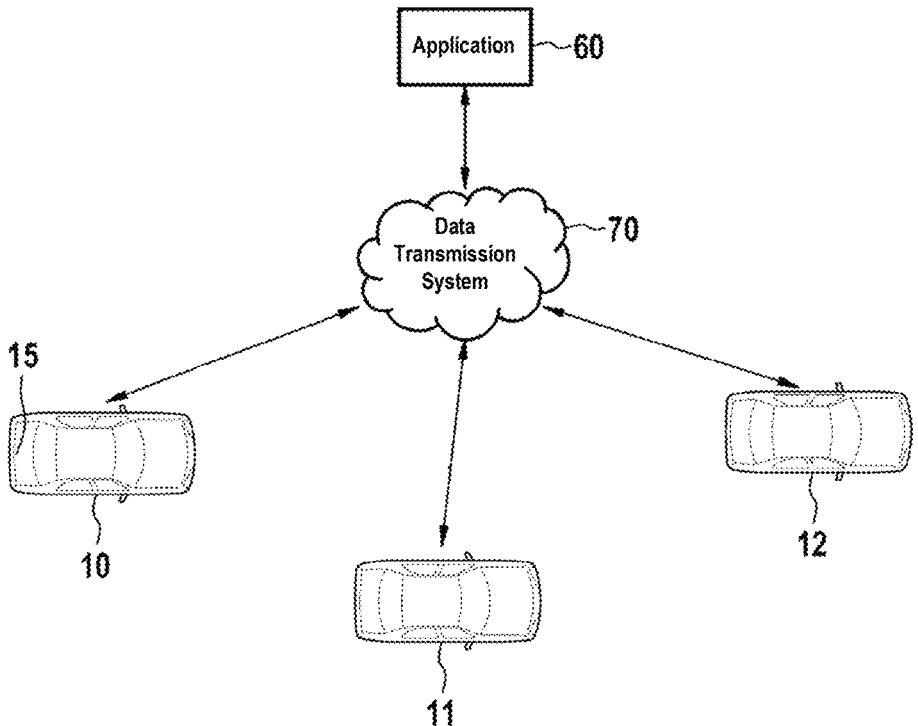
FIG. 3 exemplary representation of a scenario for data communication between an application, a data transmission system and a fleet of vehicles. A provision for fulfilling a safety requirement from the fleet vehicles in a driving situation at a point in time t according to an embodiment of the present invention.

The vehicle 10 can be a single vehicle, but it can also be a plurality of vehicles, as exemplified in FIG. 3.

An item of environment region information is generated from the data of the first environment region 20 and the second environment region 30, taking into account a corresponding perception function, if the coverage is not present.

This can be performed with or in the application 60 in accordance with FIG. 3, which receives the corresponding data for the first and second environment regions 20, 30 of the vehicle 10.

At a minimum, the environment information can include data about the state of the vehicle 10 and/or environment data about the vehicle 10 that is processed by the application 60 accordingly.

In this case, the application 60 is further designed to qualitatively assess, on the basis of the received environment region information of the vehicle 10, whether the second environment region 30 is sufficiently covered by the first environment region 20 in the driving situation of the at least one vehicle 10, taking into account the at least one safety requirement.

FIG. 3 shows an exemplary embodiment of a scenario for data communication between an application 60, a data transmission system 70 and a fleet of vehicles 10, 11, 12 for fulfilling a safety requirement for the fleet vehicles 10, 11, 12 in a driving situation at a point in time t according to an embodiment of the present invention.

As shown in FIG. 3, the vehicles 10, 11, 12 are connected to the application 60 via an unspecified but known communication interface, for example a 5G-based communication network, for bidirectional data exchange. The application 60 can be at least partially designed as an off-vehicle and cloud-based data processing unit 70.

The application 60 transmits optimized and vehicle-specific suggestion information to the number of fleet vehicles 10, 11, 12 on the basis of various types of environment information previously transmitted to the application 60 by the number of vehicles 10, 11, 12. In this case, the generation of this suggestion information can optionally be performed using a machine learning model for the number of fleet vehicles.

The application or tool 60 can further also be designed to assign certain safety requirements to certain perception regions around the vehicle 10, 11, 12—for example, by means of a so-called grid map, in order to answer the question of which redundancies in the vehicle are required for which safety requirements. The grid map can also indicate what requirements must be placed on specific sensors in the vehicle in each environment in order to fulfill a safety requirement. FIG. 3 further shows, by way of example, that the vehicle 10 has a perception system 15 that can be designed as a sensor system within the vehicle 10. Such a perception system 15 can, of course, also be implemented in the vehicles 11 and 12 of FIG. 3.

In this case, the safety requirement can also refer to a capability requirement of the vehicle in a driving situation at point in time t, in order to switch on additional perception functions from a pool of existing sensors in the vehicle under appropriate weather/light conditions. In this way, the application 60 can assign a requirement level for the perception system in the vehicle 10, 11, 12 to a particular driving situation.

What is claimed is:

1. A method for fulfilling a safety requirement of at least one vehicle in a driving situation at a point in time t, the method comprising the following steps for each of one or more specific and safety-related perception functions:

determining a first safeguarded and position-dependent environment region of the vehicle, which covers a region around the at least one vehicle for which the respective perception function is provided with at least a predefined threshold reliability to fulfill a situation-specific and/or behavior-specific safety requirement for the driving situation of the vehicle;

determining a second safety-relevant and position-dependent environment region of the at least one vehicle, which covers a region around the at least one vehicle for which the respective perception function has to be provided with a predefined increased reliability to guarantee fulfillment of the situation-specific and/or behavior-specific safety requirement for the driving situation of the vehicle and to guarantee safe driving operation of the vehicle without vehicle performance restrictions;

checking whether the second environment region is covered by the first environment region in the driving situation of the at least one vehicle; and based on the second environment region not being covered by the first environment in the driving situation of the at least one vehicle:

generating an item of environment region information of the at least one vehicle on based on the determined first and second environment regions and the respective perception function corresponding to the generation of each of the environment regions, transmitting the environment region information to an application, evaluating the environment region information by the application, and generating at least one item of suggestion information so that the safety requirement for the driving situation at the point in time t of the at least one vehicle is fulfilled.

2. The method according to claim 1, wherein the at least one vehicle is connected to the application via a communication interface for bidirectional data exchange.

3. The method according to claim 1, wherein with the step of generating the at least one item of suggestion information, transmitting the generated at least one item of suggestion information from the application to the at least one vehicle is provided.

4. The method according to claim 1, wherein the application is at least partially configured as an off-vehicle and cloud-based data processing unit.

5. The method according to claim 1, wherein the environment region information includes at least data about a state of the at least one vehicle and/or environment data about the at least one vehicle.

6. The method according to claim 1, wherein the application is configured to qualitatively assess, based on the environment region information of the at least one vehicle, whether the second environment region is sufficiently covered by the first environment region in the driving situation of the at least one vehicle, taking into account the at least one safety requirement.

7. The method according to claim 1, wherein the step of evaluating including assessing position-dependent safety requirements for at least one of the first and second environment regions of the at least one vehicle.

8. The method according to claim 7, wherein the step of evaluating further includes assigning a requirement level to the at least one environment region of the at least one vehicle.

9. The method according to claim 7, wherein the step of evaluating includes assessing relevance and/or frequency of locally occurring events in the at least one environment region of the at least one vehicle to detect a change in the at least one environment region of the at least one vehicle.

10. The method according to claim 7, wherein the evaluation is performed by a graphical representation in the form of a 3D grid model or polygonal course model, which further reflects a gradual gradation of a safety region in the at least one environment region of the at least one vehicle.

11. The method according to claim 1, wherein the generating if of the at least one item of suggestion information includes suggesting at least one in-vehicle measure for the at least one vehicle, which, based on the predetermined safety requirement, provides for at least one environment-dependent and/or situation-dependent adjustment of a configuration of sensors available in the at least one vehicle, and/or an adjustment of a driving strategy of the at least one vehicle, and/or a provision of information about a change of infrastructure in at least one of the first and second environment regions of the at least one vehicle via a digital map to enable anticipatory driving of the at least one vehicle.

12. The method according to claim 1, wherein the generating of the at least one item of suggestion information includes weighting or prioritizing the at least one item of suggestion information from a plurality of possible items of suggestion information as a function of vehicle-specific and/or situation-specific and/or environment-specific parameters.

13. The method according to claim 1, wherein the generating of the at least one item of suggestion information includes making a suggestion for improving local environment conditions that improve a physical and/or digital traffic infrastructure in at least one of the first and second environment regions of the at least one vehicle.

14. The method according to claim 1, further comprising transmitting the generated at least one item of suggestion information to a fleet of vehicles.

15. The method according to claim 1, wherein the application is configured to assess various types of environment region information transmitted to the application by a number of vehicles in a fleet and to generate optimized and vehicle-specific suggestion information using a machine learning model for the number of fleet vehicles.

16. A non-transitory machine-readable data carrier on which is stored a computer program including machine-readable instructions for fulfilling a safety requirement of at least one vehicle in a driving situation at a point in time t, the instructions, when executed by one or more computers and/or computer instances, cause the one or more computers and/or computer instances to perform the following steps for each of one or more specific and safety-related perception functions:

determining a first safeguarded and position-dependent environment region of the vehicle, which covers a region around the at least one vehicle for which the respective perception function is provided with at least a predefined threshold reliability to fulfill a situation-specific and/or behavior-specific safety requirement for the driving situation of the vehicle;

determining a second safety-relevant and position-dependent environment region of the at least one vehicle, which covers a region around the at least one vehicle for which the respective perception function has to be provided with a predefined increased reliability to guarantee fulfillment of the situation-specific and/or behavior-specific safety requirement for the driving situation of the vehicle and to guarantee safe driving operation of the vehicle without vehicle performance restrictions;

checking whether the second environment region is covered by the first environment region in the driving situation of the at least one vehicle; and based on the second environment region not being covered by the first environment in the driving situation of the at least one vehicle:

generating an item of environment region information of the at least one vehicle on based on the determined first and second environment regions and the respective perception function corresponding to the generation of each of the environment regions, transmitting the environment region information to an application, evaluating the environment region information by the application, and generating at least one item of suggestion information so that the safety requirement for the driving situation at the point in time t of the at least one vehicle is fulfilled.

17. A computer or a plurality of computers and/or computer instances configured to fulfill a safety requirement of at least one vehicle in a driving situation at a point in time t, the plurality of computers and/or computer instances configured to, for each of one or more specific and safety-related perception functions:

determine a first safeguarded and position-dependent environment region of the vehicle, which covers a region around the at least one vehicle for which the respective perception function is provided with at least a predefined threshold reliability to fulfill a situation-specific and/or behavior-specific safety requirement for the driving situation of the vehicle;

determine a second safety-relevant and position-dependent environment region of the at least one vehicle, which covers a region around the at least one vehicle for which the respective perception function has to be provided with a predefined increased reliability to guarantee fulfillment of the situation-specific and/or behavior-specific safety requirement for the driving situation of the vehicle and to guarantee safe driving operation of the vehicle without vehicle performance restrictions;

check whether the second environment region is covered by the first environment region in the driving situation of the at least one vehicle; and based on the second environment region not being covered by the first environment in the driving situation of the at least one vehicle:

generate an item of environment region information of the at least one vehicle on based on the determined first and second environment regions and the respective perception function corresponding to the generation of each of the environment regions, transmit the environment region information to an application, evaluate the environment region information by the application, and generate at least one item of suggestion information so that the safety requirement for the driving situation at the point in time t of the at least one vehicle is fulfilled.

*    *    *    *    *